US009721059B1

(12) United States Patent
Ethirajan et al.

(10) Patent No.: US 9,721,059 B1
(45) Date of Patent: Aug. 1, 2017

(54) POST-LAYOUT THERMAL-AWARE INTEGRATED CIRCUIT PERFORMANCE MODELING

(71) Applicant: GLOBALFOUNDRIES INC., Grand Cayman (KY)

(72) Inventors: Tamilmani Ethirajan, Bangalore (IN); Ashwin Srinivas, Bengaluru (IN); Ananth Sundaram, Bangalore (IN); Janakiraman Viraraghavan, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/002,808

(22) Filed: Jan. 21, 2016

(51) Int. Cl.
  G06F 9/455 (2006.01)
  G06F 17/50 (2006.01)

(52) U.S. Cl.
  CPC ........ G06F 17/5081 (2013.01); G06F 17/505 (2013.01); G06F 17/5022 (2013.01)

(58) Field of Classification Search
  USPC ........................................................ 716/111
  See application file for complete search history.

(56) References Cited

U.S. PATENT DOCUMENTS

| 8,286,111 | B2 | 10/2012 | Chandra et al. |
| 8,332,190 | B2 | 12/2012 | Tanomura et al. |
| 8,392,867 | B2 | 3/2013 | Deng et al. |
| 8,478,576 | B1 | 7/2013 | Cameron |
| 8,539,408 | B1 | 9/2013 | Cheng et al. |
| 2003/0055613 | A1 | 3/2003 | Tsai |
| 2013/0298101 | A1 | 11/2013 | Chandra |
| 2016/0063171 | A1* | 3/2016 | Tripathi ............... G05B 19/418 716/136 |

OTHER PUBLICATIONS

Banerjee et al., "On Thermal Effects in Deep Sub-Micron VLSI Interconnects", Department of Electrical Engineering and Computer Sciences, University of California, Berkeley, CA, ACM, 1999, pp. 885-891.

(Continued)

*Primary Examiner* — Eric Lee
(74) *Attorney, Agent, or Firm* — Gibb & Riley, LLC; Michael J. LeStrange, Esq.

(57) ABSTRACT

Disclosed are integrated circuit (IC) design methods, systems and computer program products. During IC design, an electrical netlist with built-in electrical resistance elements (i.e., electrical resistors) is extracted based on an IC design layout. A thermal netlist with built-in thermal resistance elements (i.e., thermal resistors) is automatically extracted based on the electrical netlist. This thermal netlist identifies thermal resistors, external thermal nodes and internal thermal node(s) and does so such that there is one-to-one mapping of the thermal resistors to electrical resistors in the electrical netlist, one-to-one mapping of the external thermal nodes to input, output and power supply nodes in the electrical netlist and one-to-one mapping of the internal thermal node(s) to element(s) (e.g., library and/or customized elements) in the electrical netlist. The electrical and thermal netlists are combined and simulations are performed on the combined electrical-thermal netlist in order to generate a thermal-aware performance model of the IC.

17 Claims, 5 Drawing Sheets

(56) References Cited

OTHER PUBLICATIONS

Gomez et al, "Electro-Thermal Coupling Analysis Methodology for RF Circuits", Thermal Investigations of ICs and Systems (THERMINIC), IEEE, 2010, Abstract.
Swahn et al., "Electro-Thermal Analysis of Multi-Fin Devices", IEEE Transactions on Very Large Scale Integration (VLSI) Systems, vol. 16, No. 7, Jul. 2008, pp. 816-829.

* cited by examiner

FIG. 6

POST-LAYOUT THERMAL-AWARE INTEGRATED CIRCUIT PERFORMANCE MODELING

FIELD OF THE INVENTION

The present invention relates to integrated circuit (IC) design and, more particularly, to IC design methods, systems and computer program products that provide for post-layout thermal-aware integrated circuit performance modeling.

BACKGROUND

The performance of devices (e.g., field effect transistors (FETs), bipolar transistors, a capacitors, amplifiers, logic gates, etc.) in an integrated circuit (IC) and, thereby the performance of the IC can vary as a function of temperature. The temperature of a device can vary due to both the self-heating effect (SHE) and thermal coupling with adjacent heat source(s), such as metal interconnects and adjacent device(s). Current thermal-aware IC performance modeling techniques consider localized temperature changes due to self-heating and thermal coupling with adjacent heat source(s). However, these techniques typically require a designer to perform calculations that can be quite complex, time consuming and oftentimes inaccurate. Therefore, there is a need in the art for a more efficient technique for thermal-aware integrated circuit performance modeling considering thermal coupling between devices.

SUMMARY

In view of the foregoing, disclosed herein are integrated circuit (IC) design methods, systems and computer program products, which provide for post-layout thermal-aware IC performance modeling. Specifically, during IC design and, particularly, once an IC design layout has been generated, an electrical netlist with built-in electrical resistors can be extracted based on the IC design layout. Then, a thermal netlist with built-in thermal resistors can be automatically extracted based on the electrical netlist. This thermal netlist can identify thermal resistors, external thermal nodes and internal thermal node(s) and can do so such that there is one-to-one mapping of the thermal resistors to electrical resistors in the electrical netlist, one-to-one mapping of the external thermal nodes to input, output and power supply nodes in the electrical netlist and one-to-one mapping of the internal thermal node(s) to element(s) in the electrical netlist. The electrical and thermal netlists can then be combined into a combined electrical-thermal netlist and simulations can be performed on the combined electrical-thermal netlist in order to generate a thermal-aware performance model of the IC.

More particularly, disclosed herein are integrated circuit (IC) design methods that provide for post-layout thermal-aware IC performance modeling. During design of an IC, a design layout can be generated, stored and subsequently accessed (e.g., by a processor from a memory). This design layout can then be analyzed (e.g., by the processor) in order to extract an electrical netlist. This electrical netlist can identify all elements (including library elements and/or customized elements), input nodes, output nodes, power supply nodes and interconnects in the IC design layout. It should be understood that each interconnect in the IC design layout can extend between elements or between an element and an input node, an output node or a power supply node. In any case, the electrical netlist can further associate the interconnects in the IC design layout with electrical resistors, respectively. Following extraction of the electrical netlist, a thermal netlist can be extracted (e.g., automatically by the processor) based on the electrical netlist. This thermal netlist can identify thermal resistors, external thermal nodes and internal thermal node(s). Each thermal resistor can correspond to an electrical resistor in the electrical netlist, each external thermal node can correspond to an input node, an output node or a power supply node in the electrical netlist, and each internal thermal node can correspond to an element in the electrical netlist. The electrical netlist and the thermal netlist can then be combined (e.g., automatically by the processor) into a combined thermal-electrical netlist. Specifically, the two netlists can be combined by electrically connecting the internal thermal nodes to their corresponding elements. Subsequently, simulations can be performed (e.g., by the processor) using the combined thermal-electrical netlist in order to generate a thermal-aware performance model of the IC.

Also disclosed herein are integrated circuit (IC) design systems that provide for post-layout thermal-aware IC performance modeling. Each system can have a memory and at least one processor in communication with the memory. The memory can store a design layout. The processor can access the memory and analyze the design layout in order to extract an electrical netlist. This electrical netlist can identify all elements (including library elements and/or customized elements), input nodes, output nodes, power supply nodes and interconnects in the IC design layout. It should be understood that each interconnect in the IC design layout can extend between elements or between an element and an input node, an output node or a power supply node. In any case, the electrical netlist can further associate the interconnects in the IC design layout with electrical resistors, respectively. The processor can further automatically extract a thermal netlist based on the electrical netlist. This thermal netlist can identify thermal resistors, external thermal nodes and internal thermal nodes. Each thermal resistor can correspond to an electrical resistor in the electrical netlist, each external thermal node can correspond to an input node, an output node or a power supply node in the electrical netlist, and each internal thermal node can correspond to an element in the electrical netlist. The processor can then automatically combine the electrical netlist and the thermal netlist into a combined thermal-electrical netlist. Specifically, the two netlists can be combined by electrically connecting the internal thermal nodes to their corresponding elements. Subsequently, the processor can perform simulations using the combined thermal-electrical netlist in order to generate a thermal-aware performance model of the IC.

Also disclosed herein is a computer program product that provides for post-layout thermal-aware integrated circuit (IC) performance modeling during IC design. The computer program product can be a non-transitory computer readable storage medium that stores program instructions. The program instructions can be executable by one or more processors, causing the processor(s) to perform the above-described method.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, the performance of devices (e.g., field effect transistors (FETs), bipolar transistors, a capacitors, amplifiers, logic gates, etc.) in an integrated circuit (IC) and, thereby the performance of the IC can vary as a function of temperature. The temperature of a device can vary due to both the self-heating effect (SHE) and thermal coupling with adjacent heat source(s), such as metal interconnects and adjacent device(s). Current thermal-aware IC performance modeling techniques consider localized temperature changes due to self-heating and thermal coupling with adjacent heat source(s). However, these techniques typically require a designer to perform calculations that can be quite complex, time consuming and oftentimes inaccurate.

In view of the foregoing, disclosed herein are integrated circuit (IC) design methods, systems and computer program products, which provide for post-layout thermal-aware IC performance modeling. Specifically, during IC design and, particularly, once an IC design layout has been generated, an electrical netlist with built-in electrical resistors can be extracted based on the IC design layout. Then, a thermal netlist with built-in thermal resistors can be automatically extracted based on the electrical netlist. This thermal netlist can identify thermal resistors, external thermal nodes and internal thermal node(s) and can do so such that there is one-to-one mapping of the thermal resistors to electrical resistors in the electrical netlist, one-to-one mapping of the external thermal nodes to input, output and power supply nodes in the electrical netlist and one-to-one mapping of the internal thermal node(s) to element(s) (e.g., library elements and/or customized elements) in the electrical netlist. The electrical and thermal netlists can then be combined into a combined electrical-thermal netlist and simulations can be performed on the combined electrical-thermal netlist in order to generate a thermal-aware performance model of the IC.

Figure 1:
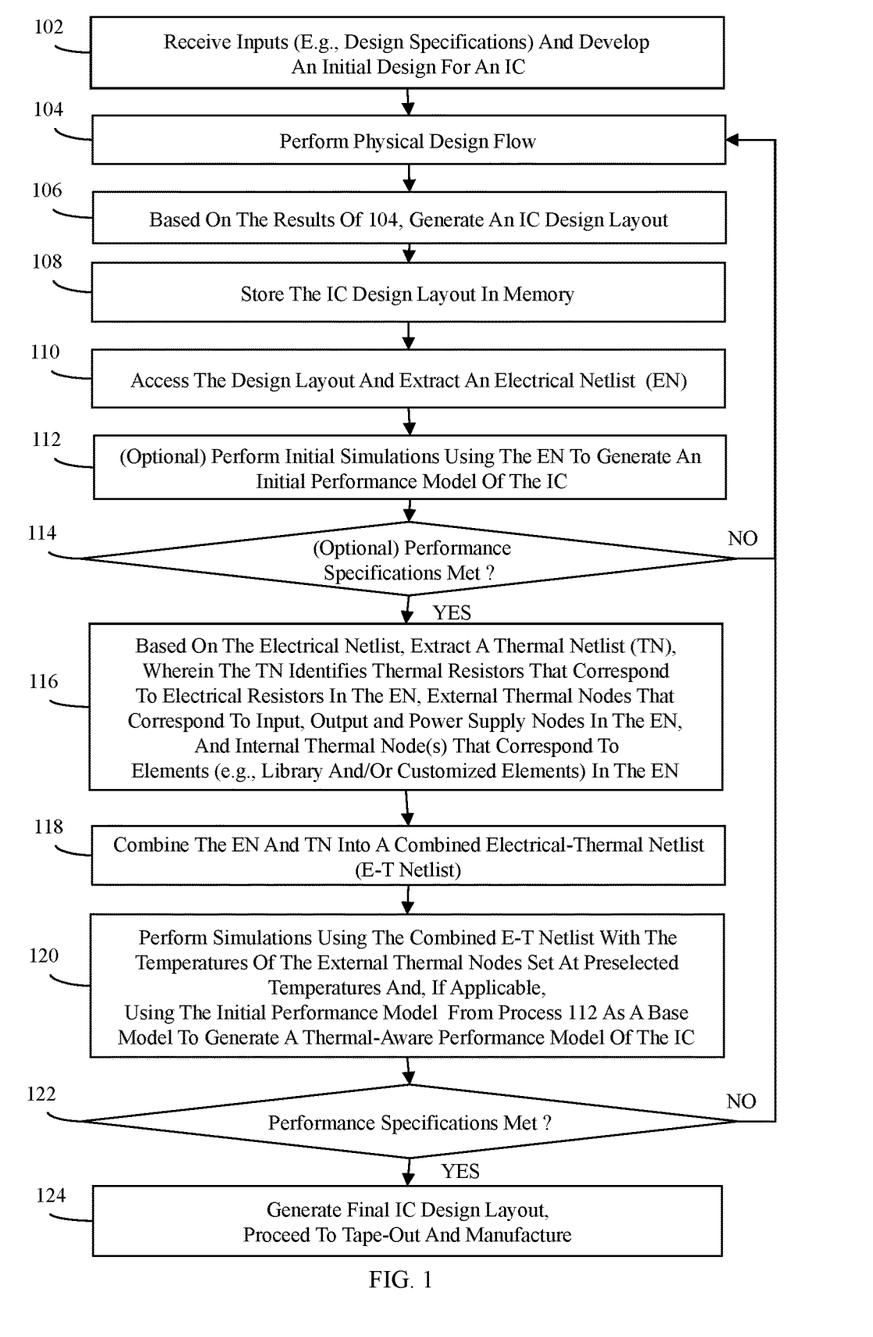
FIG. 1 is a flow diagram illustrating an integrated circuit (IC) design method that provides for post-layout thermal-aware IC performance modeling.

More particularly, referring to FIG. 1, disclosed herein are integrated circuit (IC) design methods that provide for post-layout thermal-aware IC performance modeling. The methods can, for example, be implemented using, for example, a process design kit (PDK). The PDK can be stored in a memory that is accessible by one or more processors of a design system executing electronic design automation (EDA) tools on a computer-aided design (CAD) system for the purpose of designing an IC. The PDK can include a set of foundry-specific files including, but not limited to, technology files for a specific technology node, a circuit library, design rules, etc. The circuit library can list multiple different library elements (also referred to as cells or standard cells) that can be incorporated into an IC under design in the specific technology node and, specifically, can contain library files (.libs) for each of those library elements. A given library element can represent a single device or can represent a set of devices and the interconnect structure(s) that connect those devices (i.e., a set of interconnected devices). Thus, for example, the circuit library can contain library elements that represent a single transistor, a single capacitor, etc. The circuit library can also contain library elements that represent logic gates (e.g., AND gates, NAND gates, OR gates, NOR gate, NOT gates, etc.) the incorporate multiple devices interconnected and configured to perform a logic function. The circuit library can also contain library elements that represent memory cells (e.g., SRAM cells, DRAM cells, etc.) that incorporate multiple devices interconnected and configured to perform a storage function. The circuit library can also contain library elements that represent any other IC components that incorporate multiple devices interconnected and configured to perform some other function (e.g., a processing function, a register function, etc.).

In the methods, design inputs and, particularly, design and performance specifications for an IC can be received (e.g., by a processor from a designer via a graphic user interface (GUI)). These inputs can be stored in memory (e.g., on a data storage device accessible by the processor) and an initial design for the IC can, for example, be developed by a designer based on the design specification (102). This initial design can be represented by a high-level description, which sets out the requirements for the IC. This high-level description can be stored in memory in, for example, a hardware description language (HDL), such as VHDL or Verilog. Those skilled in the art will recognize that this high-level description will set out specifications for various parameters (e.g., for channel length, channel width, doping, spacer width, etc.).

Following development of the initial design, physical design processes can be preformed (104). These physical design processes can include, but are not limited to, logic synthesis, floorplanning, power planning and input/output pin placement, library element placement, clock tree synthesis and wire routing. Those skilled in the art will recognize that, during logic synthesis, the high-level description can be synthesized into a gate-level netlist, which describes the connectivity of the IC in terms of nets. Each net is listed in the netlist and is a conductor that interconnects two or more component terminals. In library element-based design, the high-level description can be synthesized into the netlist using one or more library elements (e.g., standard cells) selected from the circuit library. During floorplanning, the size of the IC chip, the placement of the area(s) for standard library elements (i.e., library elements), the placement of the area(s) for customized library elements, etc. can be determined. During power planning, the power requirements for the IC can be estimated (e.g., based on the design specifications) and a power delivery network (PDN) (also referred herein as a power bus or grid) can be designed for the IC based on the power requirements and the floorplan. Following power planning, input/output (I/O) pin placement can be performed. That is, the I/O pads and buffers can be placed based on the floorplan and the design of the PDN. Following library element placement, clock planning for the IC can be performed. That is, a clock distribution network (CDN) (e.g., a clock tree) can be synthesized. A CDN is a network of wires and clock cells that distribute clock signals to all of the clocked library elements in the IC. After the CDN is synthesized, a wire routing process can be performed. That is, wires that electrically connect the library elements in the IC can be added to the design layout given the placement of the different library elements, etc.

It should be noted that the physical design processes can be performed based on design rules that are stored in memory. The design rules can include rule decks, also referred to as sets of rules or run sets, for one or more of the particular processes in the design flow (e.g., a logic synthesis rule deck, a floorplanning rule deck, a power planning rule deck, an input/output pin placement rule deck, a library element placement rule deck, a clock planning rule deck, and a wire routing rule deck). Techniques for performing the above-described physical design processes using such rule decks are well known in the art and, thus, the details of such techniques are omitted from this specification in order to allow the reader to focus on the salient of the disclosed methods.

It should be noted that the exemplary physical design flow processes described above are offered for illustration purposes and are not intended to be limiting. Any other suitable physical design flow processes, which result in the development of an IC design layout can be performed. For example, an alternative physical design flow could be used wherein elements are custom-designed and placed. Such customized elements could be used alone or in addition to library elements within the same IC design layout. Like a library element, a given customized element can represent a single device or can represent a set of devices and the interconnect structure(s) that connect those devices (i.e., a set of interconnected devices).

In any case, performance of wire routing at process 104 essentially completes the IC design layout. That is, based on the results of the physical design processes described above, an IC design layout is generated and stored in memory (106)-(108).

Figure 2:
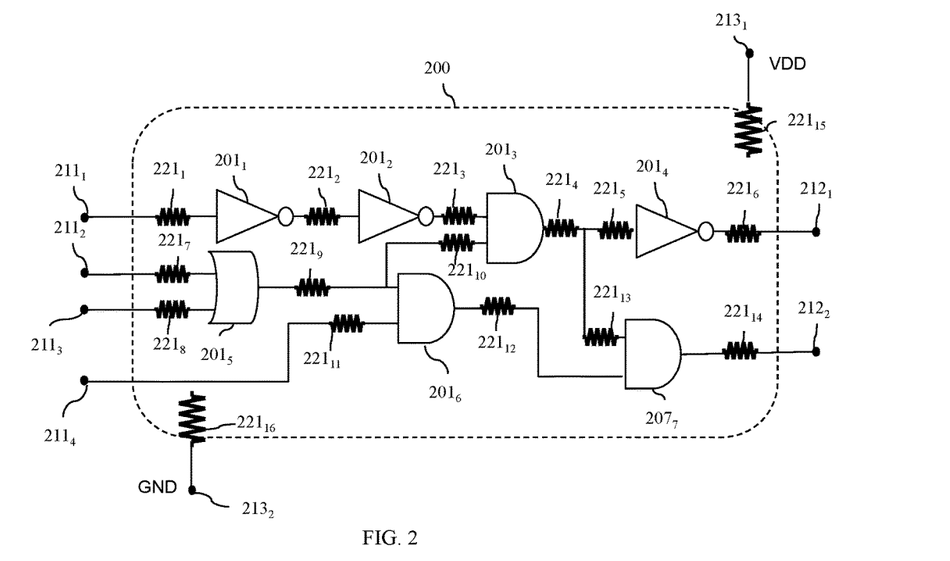
FIG. 2 is a schematic diagram illustrating an exemplary electrical netlist extracted from an IC design layout.

Subsequently, an electrical parasitic extraction process can be performed. That is, the IC design layout generated at process 106 can be accessed and analyzed (e.g., by the processor) in order to extract an electrical netlist with parasitic electrical elements and, particularly, parasitic electrical resistors built-in (110). Specifically, this electrical netlist can identify all elements (e.g., library elements and/or customized elements) placed in the IC design layout at process 104. The electrical netlist can further identify all input nodes that supply inputs to the IC, all output nodes that receive outputs from the IC and all power supply nodes (e.g., VDD and ground nodes) connected to the IC. The electrical netlist can identify all interconnects in the IC design layout. It should be understood that each interconnect in the IC design layout can extend between elements or between an element and an input node, an output node or a power supply node. In any case, the electrical netlist can further associate the interconnects in the IC design layout with parasitic electrical resistance elements (i.e., electrical resistors), respectively. For example, FIG. 2 is a schematic diagram illustrating an exemplary electrical netlist 200 extracted from an IC design layout. This electrical netlist 200 identifies multiple elements $201_1$-$201_7$. As mentioned above, these elements can be library elements (i.e., standard cells) selected from a library and/or customized elements.

For purposes of illustration, electrical netlist 200 shows a logic circuit and the elements $201_1$-$201_7$ identified are various different logic gates. That is, elements $201_1$, $201_2$ and $201_4$ are NOT gates, element $201_5$ is an OR gate, and elements $201_3$, $201_6$ and $201_7$ are AND gates. This electrical netlist 200 further identifies input nodes $211_1$-$211_4$ to the logic circuit, output nodes $212_1$-$212_2$ from the IC and power supply nodes (e.g., VDD node $212_3$ and ground node $213_2$). Finally, the electrical netlist 200 identifies all interconnects in the IC design layout including the interconnects that extend between elements $201_1$-$201_7$ or between any one of the elements and an input node, an output node or a power supply node and associates these interconnects with parasitic electrical resistance elements $221_1$-$221_{16}$ (i.e., electrical resistors), respectively. Although not shown, the electrical netlist extracted at process 110 can also identify other parasitic electrical elements such as electrical capacitors.

Optionally, initial simulations can be performed (e.g., by the processor) using the electrical netlist (112). The initial simulations (e.g., simulation program with integrated circuit emphasis (SPICE) simulations) can be performed, for example, over the full range of operating temperatures and over the full range of operating supply voltages. Those skilled in the art will recognize that during the initial simulations electrical resistances of the electrical resistors at various operating temperatures across the full range of operating temperatures can be determined, for example, based on generic metal information (e.g., interconnect metal material(s), the temperature coefficient(s) of resistance for the metal material(s), wire width, wire thickness, etc.) acquired from the technology file and/or specific metal information (e.g., interconnect lengths) acquired from the IC design layout. Based on the results of these initial simulations, an initial performance model of the IC can be generated and a determination can be made as to whether or not the performance specifications (e.g., requirements for behavior characteristics, requirements for current-voltage (I-V) characteristics, etc.) for the IC have been met (114). If one or more of the performance specifications have not been meet, design adjustments can be made and the processes 104-114 can be iteratively repeated until the performance specifications are met.

Figure 3:
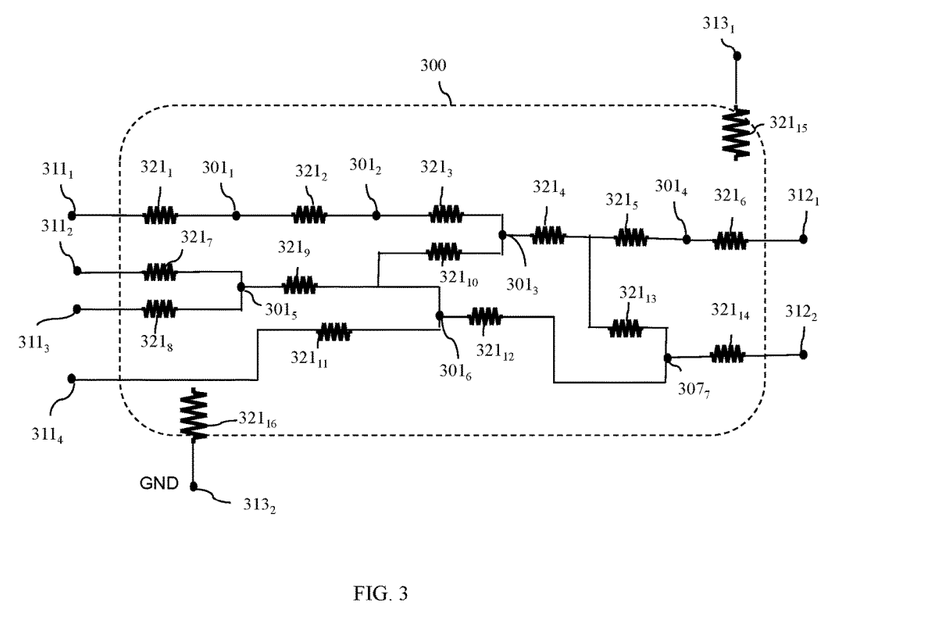
FIG. 3 is a schematic diagram illustrating an exemplary thermal netlist extracted based on the electrical netlist of FIG. 2.

Following extraction of the electrical netlist at process 110, a thermal parasitic extraction process can be performed. That is, the electrical netlist can be accessed and analyzed (e.g., automatically by the processor) in order to extract a thermal netlist with parasitic thermal elements and, particularly, thermal resistors built-in (116). Specifically, this thermal netlist can identify thermal resistors, external thermal nodes and internal thermal node(s). Each thermal resistor can correspond to an electrical resistor in the electrical netlist, each external thermal node can correspond to an input node, an output node or a power supply node in the electrical netlist, and each internal thermal node can correspond to an element in the electrical netlist. For example, FIG. 3 is a schematic diagram illustrating an exemplary thermal netlist 300 extracted based on the electrical netlist 200 of FIG. 2. This thermal netlist 300 identifies thermal resistors $321_1$-$321_{16}$, external thermal nodes $311_1$-$311_4$, $312_1$-$312_2$ and $313_1$-$313_2$ and internal thermal nodes $301_1$-$301_7$. The thermal resistors $321_1$-$321_{16}$ in the thermal netlist 300 correspond to the electrical resistors $221_1$-$221_{16}$ in the electrical netlist 200. That is, there is one-to-one mapping of the thermal resistors in the thermal netlist to the electrical resistors in the electric netlist. The external thermal nodes $311_1$-$311_4$, $312_1$-$312_2$, and $313_1$-$313_2$ in the thermal netlist 300 correspond to the input nodes $211_1$-$211_4$, output nodes $212_1$-$212_2$ and power supply nodes $213_1$-$213_2$ in the electrical netlist 200, respectively. That is, there is one-to-one mapping of the external thermal nodes in the thermal netlist to the input, output and power supply nodes in the electrical netlist. Finally, the internal thermal nodes $301_1$-$301_7$ in the thermal netlist 300 correspond to the elements $201_1$-$201_7$ in the electrical netlist. That is, there is one-to-one mapping of the internal thermal nodes in the thermal netlist to the elements in the electrical netlist. Although not shown, the thermal netlist extracted at process 116 can also identify thermal capacitors such that there is one-to-one mapping of thermal capacitors in the thermal netlist to any electrical capacitors in the electrical netlist.

Figure 4:
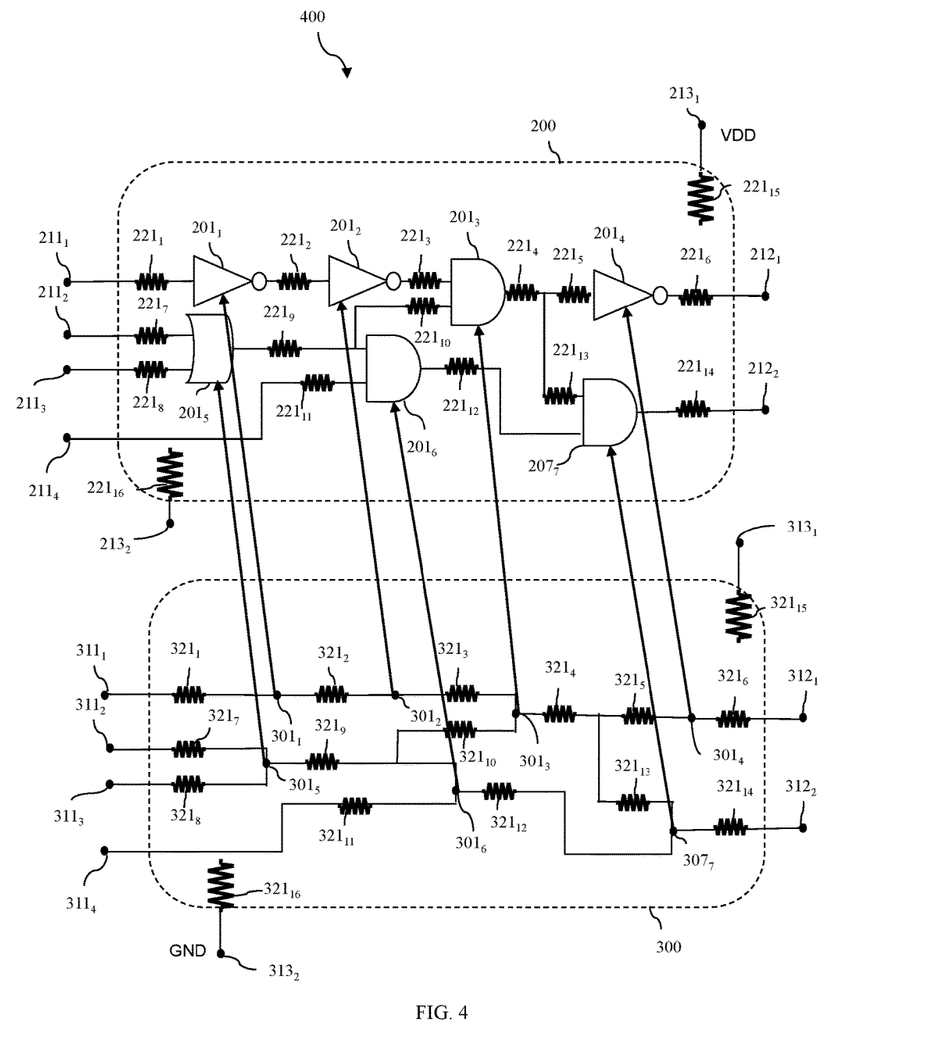
FIG. 4 is a schematic diagram illustrating an exemplary combined electrical-thermal netlist generated by combining the electrical netlist of FIG. 2 with the thermal netlist of FIG. 3.

The electrical netlist and the thermal netlist can then be combined (e.g., automatically by the processor) into a combined thermal-electrical netlist (118). Specifically, the two netlists can be combined by electrically connecting the internal thermal nodes to their corresponding elements and, particularly, to temperature nodes (T-nodes) of the corresponding elements. For example, FIG. 4 is a schematic diagram illustrating an exemplary combined electrical-thermal netlist 400 generated by combining the electrical netlist 200 of FIG. 2 with the thermal netlist 300 of FIG. 3. As illustrated, in this combined electrical-thermal netlist 400 internal thermal nodes $301_1$-$301_7$ of the thermal netlist 300 are electrically connected to the elements $201_1$-$201_7$ of the electrical netlist 200 and, particularly, to temperature nodes (T-nodes) of the corresponding elements. The T-nodes are electrically isolated nodes in the compact model coupled through a dependent current source.

Subsequently, simulations can be performed (e.g., by the processor) using the combined thermal-electrical netlist (120). These simulations (e.g., simulation program with integrated circuit emphasis (SPICE) simulations) can be performed, for example, over the full range of operating temperatures and over the full range of operating supply voltages. Alternatively, if an initial performance model was generated at process 112, this initial performance model can be used as a base model so that the overall number of simulations performed is reduced. For example, given the base model, the simulations can be performed over a smaller range of operating temperatures and/or a smaller range of operating supply voltages.

For purpose of illustration, the simulations at process 120 are described below with respect to the combined electrical-thermal netlist 400 of FIG. 4. Prior to the performance of the simulations, first temperatures to be associated with the external thermal nodes $311_1$-$311_4$, $312_1$-$312_2$, and $313_1$-$313_2$ in the thermal netlist portion of the combined electrical-thermal netlist 400 can be pre-selected (e.g., by a designer) and used as inputs. The first temperatures that are preselected for association with the external thermal nodes $311_1$-$311_4$, $312_1$-$312_2$, and $313_1$-$313_2$ can all be the same. That is, the first temperatures can all be equal to the same temperature, such as a predetermined ambient temperature. Alternatively, the first temperatures that are preselected for association with the external thermal nodes $311_1$-$311_4$, $312_1$-$312_2$, and $313_1$-$313_2$ can be multiple different temperatures, which are determined by the designer to be suitable for use in the simulations.

In any case, during the simulations at process 120, electrical resistances can be determined for the electrical resistors $221_1$-$221_{16}$ in the electrical netlist 200 portion of the combined electrical-thermal netlist 400 across a range of operating temperatures, as described above at process 112. Based on the electrical resistances of the electrical resistors at a given operating temperature and given the preselected first temperatures at the external thermal nodes $311_1$-$311_4$, $312_1$-$312_2$ and $313_1$-$313_2$ of the thermal netlist 300 portion of the combined electrical-thermal netlist 400, thermal resistances of the thermal resistors $321_1$-$321_{16}$ at the given operating temperature can be determined. Specifically, the thermal resistances of the thermal resistors $321_1$-$321_{16}$ can be determined using the Wiedemann-Franz law, which indicates that the ratio of thermal conductivity to electrical conductivity is constant for a given temperature and which can be described by the following equation:

$$\frac{K}{\sigma} = LT, \qquad (1)$$

where K represents thermal conductivity, σ represents thermal conductivity, T is the given temperature, and L is proportionality constant that is known as the Lorenz number and that can be expressed as follows:

$$L = \frac{\pi^2}{3}\left(\frac{k^2}{e^2}\right), \qquad (2)$$

where k represents the Boltzman Constant and e represents an electron charge. Furthermore, given the thermal resistances of the thermal resistors of the thermal resistors $321_1$-$321_{16}$, second temperatures associated with the internal thermal nodes $301_1$-$301_7$ can be determined and, because the internal thermal nodes $301_1$-$301_7$ are electrically connected to corresponding elements $201_1$-$201_7$ in the electrical netlist 200 portion of the combined electrical-thermal netlist 400, the second temperatures at the internal thermal nodes $301_1$-$301_7$ can in turn be applied to the corresponding elements $201_1$-$201_7$ It should be understood that determining the electrical resistance values, the thermal resistance values and the second temperatures would be performed iteratively because, as the second temperatures at the internal thermal nodes $301_1$-$301_7$ are determined and applied to the corresponding elements $201_1$-$201_7$, temperature-dependent performance parameters associated with the elements $201_1$-$201_7$ will vary, thereby causing the electrical resistance values of adjacent electrical resistors to vary and so on. Based on the results of the simulations at process 120, a thermal-aware performance model of the IC can be generated. This thermal-aware performance model accounts for possible variations in the performance of the elements $201_1$-$201_7$ due to both the self-heating effect (SHE) and thermal coupling with adjacent heat source(s) (e.g., the interconnects connected between and to the elements as well as the adjacent elements).

Next, a determination can be made as to whether or not the performance specifications (e.g., requirements for behavior characteristics, requirements for current-voltage (I-V) characteristics, etc.) for the IC are met (122). If one or more of the performance requirements have not been meet, design adjustments can be made and the processes 104-122 can be iteratively repeated until each performance requirement is met. That is, the IC design layout can be modified at process 104 in an attempt to meet each performance requirement. Then, processes 106-122 can be repeated. When the integrated circuit meets each performance requirement, the current IC design layout can be stored as the final IC design layout (124). Those skilled in the art will recognize that one or more other verification processes (e.g., timing and signal integrity verification, physical verification, electromigration fails and voltage drop verification, etc.) may, optionally, be performed prior to completion of the final IC design layout. Once the final IC design layout is completed and stored in memory, it can be released to manufacturing. That is, IC chips can be manufactured according to the design set forth in the final IC design layout.

Figure 5:
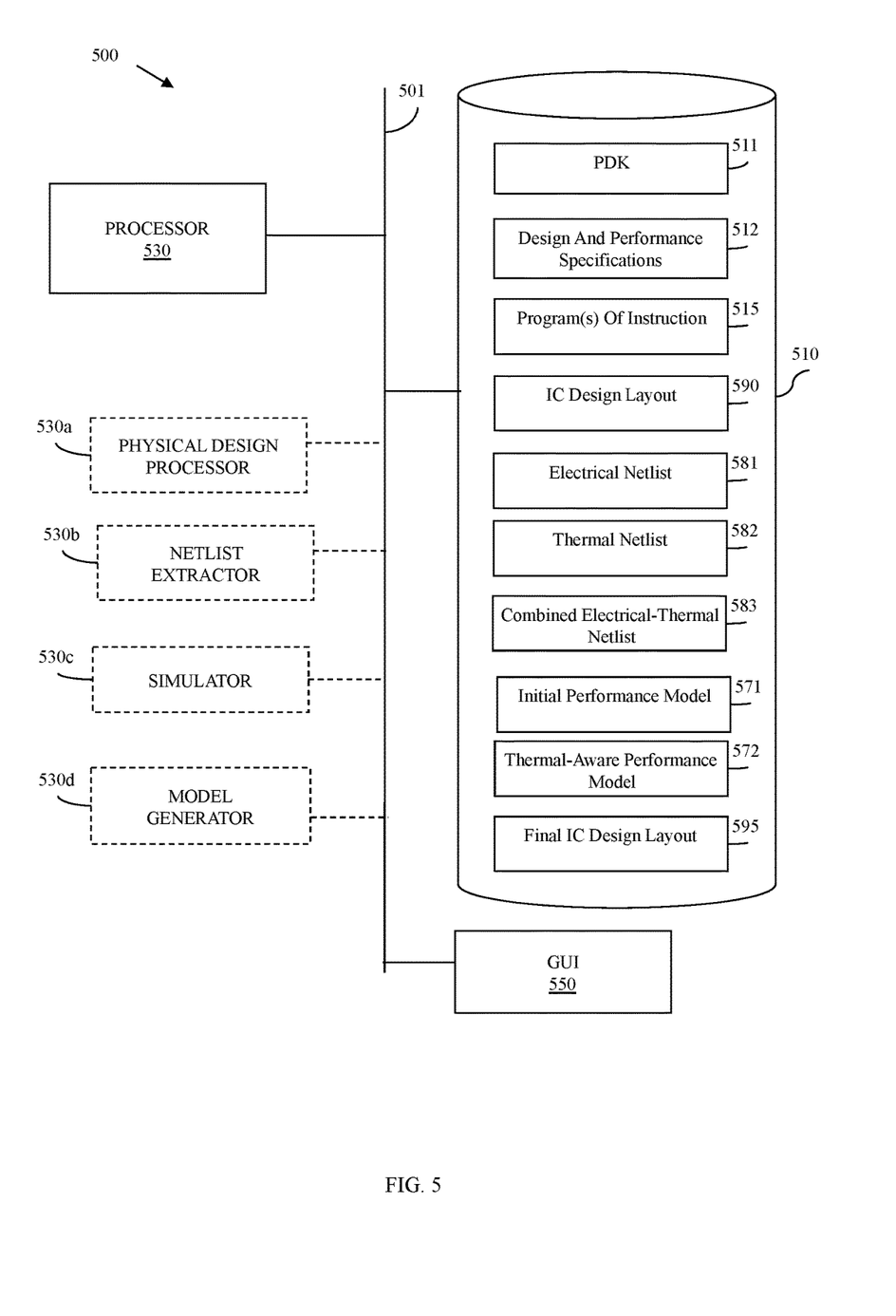
FIG. 5 is a schematic diagram illustrating an integrated circuit (IC) design system that provides for post-layout thermal-aware IC performance modeling.

Referring to FIG. 5, also disclosed herein are integrated circuit (IC) design systems 500 that provide for post-layout thermal-aware IC performance modeling. Each design system 500 can be a computer-aided design (CAD) system and, specifically, can incorporate at least one memory 510 (e.g., at least one computer readable storage medium, such as a computer readable storage device), a user interface 550 (e.g., a graphic user interface (GUI)) and at least one processor (e.g., 530 or 530a-d, see detailed discussion below). Components of the design system 500, including the processor(s), memory(ies) and GUI, can be interconnected over a system bus 501, as illustrated. Alternatively, any one or more of the components of the system 500 can communicate with any other component over a wired or wireless network.

The memory 510 can store program(s) 515 of instruction (e.g., electronic design automation (EDA) tool(s)) for performing the various design processes described in detail below. The memory 510 can further store, for example, a design kit (PDK) 511. This PDK can include a set of foundry-specific files including, but not limited to, technology files for a specific technology node, a circuit library, design rules, design and performance specifications, etc., as discussed in detail above with regard to the method.

As mentioned above, the design system 500 can incorporate at least one processor. Specifically, the design system 500 can incorporate a single specialized processor 530 (e.g., a single specialized computer processing unit) that, during IC design, performs (i.e., that is adapted to perform, that is configured to perform and/or that executes program(s) 515 of instructions to perform) multiple process steps, as described in detail below. Alternatively, the design system 500 can incorporate multiple specialized processors 530a-d (e.g., multiple different specialized computer processing units) and, during IC design, each processor can perform (i.e., can be adapted to perform, can be configured to perform and/or can execute one or more specific programs 512 of instructions to perform) one or more of the multiple process steps, as described in detail below. For purposes of illustration, four different special purpose processors are shown in FIG. 5 including a physical design processor 530a, a netlist extractor 530b, a simulator 530c, and a model generator 530d. It should be understood that FIG. 5 is not intended to be limiting and, alternatively, the multiple process steps, as described in detail below, can be performed by any number of one or more processors.

The design system 500 can receive (e.g., can be adapted to receive, can be configured to receive, etc.) design inputs and, particularly, design and performance specifications for an IC in a specific technology node (e.g., design specifications 511). These design and performance specifications 512 can be received, for example, from a designer via the graphic user interface (GUI) 550 and stored in memory 510. Using the GUI 550, the designer can, for example, develop an initial design for the IC. This initial design can be represented by a high-level description, which sets out the requirements for the IC chip. This high-level description can be stored in the memory 510 in, for example, a hardware description language (HDL), such as VHDL or Verilog. Those skilled in the art will recognize that this high-level description will set out specifications for various parameters (e.g., for channel length, channel width, doping, spacer width, etc.).

Following development of the initial design, the processor 530 (or, if applicable, the physical design processor 530a) can perform (i.e., can be adapted to perform, can be configured to perform, can execute a program 515 of instructions to perform, etc.) physical design processes required to generate an IC design layout 590 and store that IC design layout 590 in memory 510. As discussed in detail above with regard to the method, these physical design processes can, for example, include, but are not limited to, logic synthesis, floorplanning, power planning and input/output pin placement, library element placement, clock tree synthesis and wire routing. Again, it should be noted that the exemplary physical design flow processes described above are offered for illustration purposes and are not intended to be limiting. Any other suitable physical design flow processes, which result in the development of an IC design layout can be performed. For example, an alternative physical design flow could be used wherein elements are custom-designed and placed. Such customized elements could be used alone or in addition to library elements within the same IC design layout. Like a library element, a given customized element can represent a single device or can represent a set of devices and the interconnect structure(s) that connect those devices (i.e., a set of interconnected devices). In any case, performance of wire routing essentially completes the IC design layout 590.

The processor 530 (or, if applicable, the netlist extractor 530b) can perform (i.e., can be adapted to perform, can be configured to perform, can execute a program 515 of instructions to perform, etc.) an electrical parasitic extraction process. That is, the IC design layout 590 can be accessed and analyzed in order to extract and store in memory 510 an electrical netlist 581 with parasitic electrical resistance elements (i.e., parasitic electrical resistors) built-in. Specifically, this electrical netlist 581 can identify all elements (e.g., library elements and/or customized elements) placed in the IC design layout 590. The electrical netlist 581 can further identify all input nodes that supply inputs to the IC, all output nodes that receive outputs from the IC and all power supply nodes (e.g., VDD and ground nodes) connected to the IC. The electrical netlist 581 can also identify all interconnects in the IC design layout. It should be understood that each interconnect in the IC design layout can extend between elements or between an element and an input node, an output node or a power supply node. In any case, the electrical netlist 581 can further associate the interconnects in the IC design layout with parasitic electrical resistance elements (i.e., electrical resistors), respectively. As discussed in detail above with regard to the methods, FIG. 2 is a schematic diagram illustrating an exemplary electrical netlist 200 extracted from an IC design layout. This electrical netlist 200 identifies multiple elements $201_1$-$201_7$ and, particularly, library elements (i.e., standard cells) selected from a library and/or customized elements. For purposes of illustration, electrical netlist 200 shows a logic circuit and the elements $201_1$-$201_7$ identified are various different logic gates. That is, elements $201_1$, $201_2$ and $201_4$ are NOT gates, element $201_5$ is an OR gate, and elements $201_3$, $201_6$ and $201_7$ are AND gates. This electrical netlist 200 further identifies input nodes $211_1$-$211_4$ to the logic circuit, output nodes $212_1$-$212_2$ from the IC and power supply nodes (e.g., VDD node $212_3$ and ground node $213_2$). Finally, the electrical netlist 200 identifies all interconnects in the IC design layout including the interconnects that extend between elements $201_1$-$201_7$ or between any one of the elements and an input node, an output node or a power supply node and associates these interconnects with parasitic electrical resistance elements $221_1$-$221_{16}$ (i.e., electrical resistors), respectively. Although not shown, the extracted electrical netlist can also identify other parasitic electrical elements such as electrical capacitors.

Optionally, the processor 530 (or, if applicable, the simulator 530c) can perform (i.e., can be adapted to perform, can be configured to perform, can execute a program 515 of instructions to perform, etc.) initial simulations using the electrical netlist 581. The initial simulations (e.g., simulation program with integrated circuit emphasis (SPICE) simulations) can be performed, for example, over the full range of operating temperatures and over the full range of operating supply voltages. Those skilled in the art will recognize that during the initial simulations electrical resistances of the electrical resistors at various operating temperatures across the full range of operating temperatures can be determined, for example, based on generic metal information (e.g., interconnect metal material(s), the temperature coefficient(s) of resistance for the metal material(s), wire width, wire thickness, etc.) acquired from the technology file and/or specific metal information (e.g., interconnect lengths) acquired from the IC design layout.

Based on the results of these initial simulations, the processor 530 (or, if applicable, the model generator 530d) can generate and store in memory 510 (i.e., can be adapted to generate and store in memory, can be configured to generate and store in memory, can execute a program 515 of instructions to generate and store in memory, etc.) an initial performance model of the IC. The processor 530 (or, if applicable, the model generator 530d) can further make a determination as to whether or not the performance specifications (e.g., requirements for behavior characteristics, requirements for current-voltage (I-V) characteristics, etc.) for the IC have been met. If one or more of the performance specifications have not been meet, design adjustments can be made and the physical design processes can be repeated until the performance specifications are met.

Following extraction of the electrical netlist 581, the processor 530 (or, if applicable, the netlist extractor 530b) can perform (i.e., can be adapted to perform, can be configured to perform, can execute a program 515 of instructions to perform, etc.) an automatic thermal parasitic extraction process. That is, the electrical netlist 581 can be accessed and analyzed (e.g., automatically) in order to extract and store in memory 510 a thermal netlist 582 with parasitic thermal resistance elements (i.e., thermal resistors) built-in. Specifically, this thermal netlist 582 can identify thermal resistors, external thermal nodes and internal thermal node(s). Each thermal resistor can correspond to an electrical resistor in the electrical netlist, each external thermal node can correspond to an input node, an output node or a power supply node in the electrical netlist, and each internal thermal node can correspond to an element in the electrical netlist. As discussed in detail above with regard to the methods, FIG. 3 is a schematic diagram illustrating an exemplary thermal netlist 300 extracted based on the electrical netlist 200 of FIG. 2. This thermal netlist 300 identifies thermal resistors $321_1$-$321_{16}$, external thermal nodes $311_1$-$311_4$, $312_1$-$312_2$ and $313_1$-$313_2$ and internal thermal nodes $301_1$-$301_7$. The thermal resistors $321_1$-$321_{16}$ in the thermal netlist 300 correspond to the electrical resistors $221_1$-$221_{16}$ in the electrical netlist 200. That is, there is one-to-one mapping of the thermal resistors in the thermal netlist to the electrical resistors in the electric netlist. The external thermal nodes $311_1$-$311_4$, $312_1$-$312_2$, and $313_1$-$313_2$ in the thermal netlist 300 correspond to the input nodes $211_1$-$211_4$, output nodes $212_1$-$212_2$ and power supply nodes $213_1$-$213_2$ in the electrical netlist 200, respectively. That is, there is one-to-one mapping of the external thermal nodes in the thermal netlist to the input, output and power supply nodes in the electrical netlist. Finally, the internal thermal nodes $301_1$-$301_7$ in the thermal netlist 300 correspond to the elements $201_1$-$201_7$ (e.g., the library elements and/or customized elements) in the electrical netlist. That is, there is one-to-one mapping of the internal thermal nodes in the thermal netlist to the library elements in the electrical netlist. Although not shown, the extracted thermal netlist can also identify thermal capacitors such that there is one-to-one mapping of thermal capacitors in the thermal netlist to any electrical capacitors in the electrical netlist.

The processor 530 (or, if applicable, the netlist extractor 530b) can further automatically combine (i.e., can be adapted to automatically combine, can be configured to automatically combine, can execute a program 515 of instructions to automatically combine, etc.) the electrical netlist 581 and the thermal netlist 582 into a combined thermal-electrical netlist 583, which can also be stored in memory 510. Specifically, the two netlists can be combined by electrically connecting the internal thermal nodes to their corresponding elements. As discussed in detail above with regard to the methods, FIG. 4 is a schematic diagram illustrating an exemplary combined electrical-thermal netlist 400 generated by combining the electrical netlist 200 of FIG. 2 with the thermal netlist 300 of FIG. 3. As illustrated, in this combined electrical-thermal netlist 400 internal thermal nodes $301_1$-$301_7$ of the thermal netlist 300 are electrically connected to the elements $201_1$-$201_7$ of the electrical netlist 200 and, particularly, to temperature nodes (T-nodes) of the corresponding elements. As discussed above, T-nodes are electrically isolated nodes in the compact model coupled through a dependent current source.

Subsequently, the processor 530 (or, if applicable, the simulator 530c) can perform simulations (i.e., can be adapted to perform simulations, can be configured to perform simulations, can execute a program 515 of instructions to perform simulations, etc.) using the combined thermal-electrical netlist 583. These simulations (e.g., simulation program with integrated circuit emphasis (SPICE) simulations) can be performed, for example, over the full range of operating temperatures and over the full range of operating supply voltages. Alternatively, if an initial performance model 571 was previously generated, this initial performance model 571 can be accessed and used as a base model so that the overall number of simulations performed is reduced. For example, given the base model, the simulations can be performed over a smaller range of operating temperatures and/or a smaller range of operating supply voltages.

For purpose of illustration, these simulations are described below with respect to the combined electrical-thermal netlist 400 of FIG. 4. Prior to the performance of the simulations, first temperatures to be associated with the external thermal nodes $311_1$-$311_4$, $312_1$-$312_2$, and $313_1$-$313_2$ in the thermal netlist portion of the combined electrical-thermal netlist 400 can be pre-selected (e.g., by a designer) and input into the system (e.g., using the GUI 550). The first temperatures that are preselected for association with the external thermal nodes $311_1$-$311_4$, $312_1$-$312_2$, and $313_1$-$313_2$ can all be the same. That is, the first temperatures can all be equal to the same temperature, such as a predetermined ambient temperature. Alternatively, the first temperatures that are preselected for association with the external thermal nodes $311_1$-$311_4$, $312_1$-$312_2$, and $313_1$-$313_2$ can be different temperatures, which determined by the designer to be suitable for use in the simulations.

In any case, during the simulations, electrical resistances can be determined for the electrical resistors $221_1$-$221_{16}$ in the electrical netlist 200 portion of the combined electrical-thermal netlist 400 across a range of operating temperatures, as described above at process 112. Based on the electrical resistances of the electrical resistors at a given operating temperature and given the preselected first temperatures at the external thermal nodes $311_1$-$311_4$, $312_1$-$312_2$ and $313_1$-$313_2$ of the thermal netlist 300 portion of the combined electrical-thermal netlist 400, thermal resistances of the thermal resistors $321_1$-$321_{16}$ at the given operating temperature can be determined. Specifically, the thermal resistances of the thermal resistors $321_1$-$321_{16}$ can be determined using the Wiedemann-Franz law (see equations (1)-(2) above). Furthermore, given the thermal resistances of the thermal resistors of the thermal resistors $321_1$-$321_{16}$, second temperatures associated with the internal thermal nodes $301_1$-$301_7$ can be determined and, because the internal thermal nodes $301_1$-$301_7$ are electrically connected to corresponding elements $201_1$-$201_7$ in the electrical netlist 200 portion of the combined electrical-thermal netlist 400, the second temperatures at the internal thermal nodes $301_1$-$301_7$ can in turn be applied to the corresponding elements $201_1$-$201_7$. It should be understood that determining the electrical resistance values, the thermal resistance values and the second temperatures would be performed iteratively because, as the second temperatures at the internal thermal nodes $301_1$-$301_7$ are determined and applied to the corresponding elements $201_1$-$201_7$, temperature-dependent performance parameters associated with the elements $201_1$-$201_7$ will vary, thereby causing the electrical resistance values of adjacent electrical resistors to vary and so on.

Based on the results of the simulations, the processor 530 (or, if applicable, the model generator 530d) can generate and store in memory 510 (i.e., can be adapted to generate and store in memory, can be configured to generate and store in memory, can execute a program 515 of instructions to generate and store in memory, etc.) a thermal-aware performance model 572 of the IC. This thermal-aware performance model accounts for possible variations in the performance of the elements $201_1$-$201_7$ due to both the self-heating effect (SHE) and thermal coupling with adjacent heat source(s) (e.g., the interconnects connected between and to the elements as well as the adjacent elements). The processor 530 (or, if applicable, the model generator 530d) can further make a determination as to whether or not the performance specifications (e.g., requirements for behavior characteristics, requirements for current-voltage (I-V) characteristics, etc.) for the IC are met. If one or more of the performance requirements have not been meet, design adjustments can be made and the physical design processed, described above, can be iteratively repeated until each performance requirement is met. That is, the IC design layout can be modified in an attempt to meet each performance requirement. Then, the processor 530 (or, if applicable, the netlist extractor 530b, the simulator 530c and the model generator 530d) can repeat the various processes described above. When the integrated circuit meets each performance requirement, the current IC design layout can be stored in memory 510 as the final IC design layout 595. Those skilled in the art will recognize that the processor 530 may further perform one or more other verification processes (e.g., timing and signal integrity verification, physical verification, electromigration fails and voltage drop verification, etc.) may prior to completion of the final IC design layout. Once the final IC design layout 595 is completed and stored in memory 595, it can be released to manufacturing. That is, integrated circuit can be manufactured according to the design set forth in the final IC design layout 595.

Also disclosed herein is a computer program product that provides for post-layout thermal-aware integrated circuit (IC) performance modeling during IC design. The computer program product can be a non-transitory computer readable storage medium that stores program instructions. The program instructions can be executable by one or more processors, causing the processor(s) to perform the above-described method. More particularly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may incorporate copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which has one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
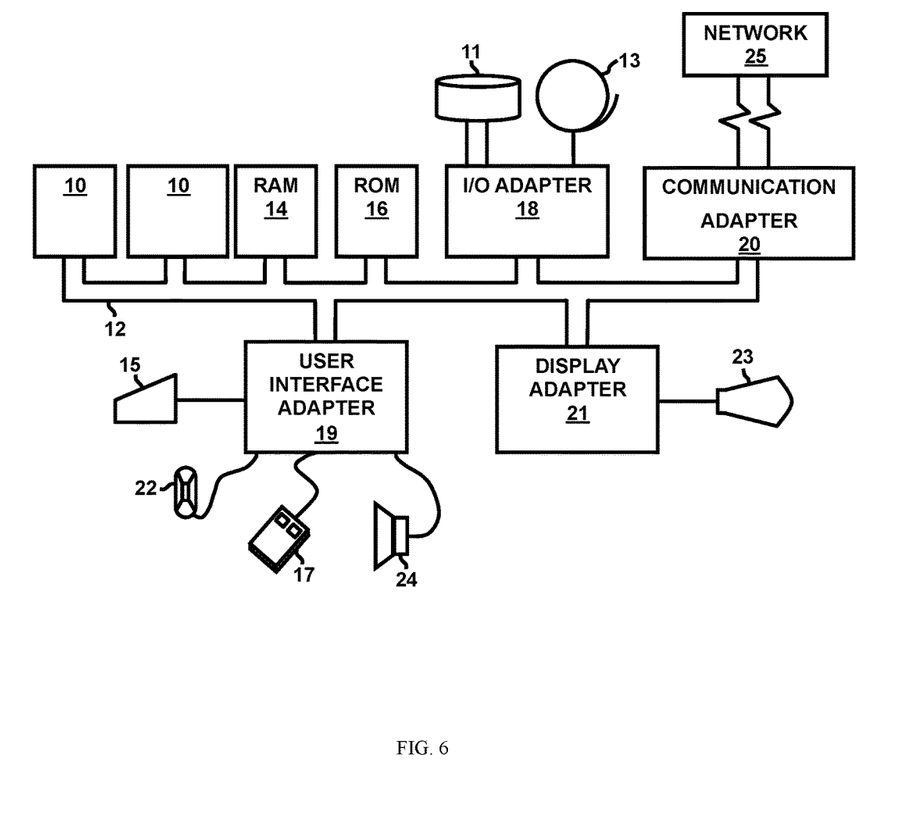
FIG. 6 is a schematic diagram illustrating a representative hardware environment (for implementing the disclosed design methods, systems and computer program products.

A representative hardware environment (i.e., a computer system) for implementing the above described design methods, systems and computer program products is depicted in FIG. 6. This schematic drawing illustrates a hardware configuration of an information handling/computer system in accordance with the embodiments herein. The system incorporates at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed methods, systems and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are integrated circuit (IC) design methods, systems and computer program products, which provide for post-layout thermal-aware IC performance modeling. Specifically, during IC design and, particularly, once an IC design layout has been generated, an electrical netlist with built-in electrical resistance elements (i.e., electrical resistors) can be extracted based on the IC design layout. Then, a thermal netlist with built-in thermal resistance elements (i.e., thermal resistors) can be automatically extracted based on the electrical netlist. This thermal netlist can identify thermal resistors, external thermal nodes and internal thermal node(s) and can do so such that there is one-to-one mapping of the thermal resistors to electrical resistors in the electrical netlist, one-to-one mapping of the external thermal nodes to input, output and power supply nodes in the electrical netlist and one-to-one mapping of the internal thermal node(s) to element(s) (e.g., library elements and/or customized elements) in the electrical netlist. The electrical and thermal netlists can then be combined into a combined electrical-thermal netlist and simulations can be performed on the combined electrical-thermal netlist in order to generate a thermal-aware performance model of the IC.

What is claimed is:

1. A method comprising:
   accessing, by a processor from a memory, a design layout of an integrated circuit;
   analyzing, by the processor, the design layout to extract an electrical netlist, the electrical netlist identifying all elements, input nodes, output nodes, power supply nodes and interconnects in the design layout and further associating all the interconnects with electrical resistors;
   extracting, by the processor, a thermal netlist based on the electrical netlist and using a one-to-one mapping technique such that the thermal netlist identifies thermal resistors, external thermal nodes and internal thermal nodes and such that each thermal resistor corresponds to a single electrical resistor, each external thermal node corresponds to a single one of an input node, an output node and a power supply node, and each internal thermal node corresponds to a single element;
   combining, by the processor, the electrical netlist and the thermal netlist into a combined thermal-electrical netlist by electrically connecting the internal thermal nodes of the thermal netlist to corresponding elements of the electrical netlist;
   performing, by the processor, simulations using the combined thermal-electrical netlist to generate a thermal-aware performance model of the integrated circuit;
   determining, based on the thermal-aware performance model, whether the integrated circuit meets a performance requirement;
   when the integrated circuit meets the performance requirement, releasing the design layout as a final design layout for manufacturing;
   when the integrated circuit fails to meet the performance requirement, modifying the design layout to meet the performance requirement and releasing the final design layout for manufacturing; and,
   manufacturing integrated circuits according to the final design layout.

2. The method of claim 1, further comprising, during performance of the simulations:
   determining electrical resistances of the electrical resistors; and,
   based on the electrical resistances, determining thermal resistances of the thermal resistors.

3. The method of claim 2, further comprising:
   associating preselected first temperatures with the external thermal nodes;
   using the preselected first temperatures at the external thermal nodes and the thermal resistances of the thermal resistors to determine second temperatures at the internal thermal nodes; and
   applying the second temperatures to the elements.

4. The method of claim 3, the preselected first temperatures each being equal to a same ambient temperature.

5. The method of claim 1, the integrated circuit comprising any number of one or more elements.

6. The method of claim 1, each element being any one of a library element and a customized element and comprising any of a single device and a set of interconnected devices.

7. A system comprising:
   a memory storing a design layout of an integrated circuit; and,
   a processor in communication with the memory, the processor performing the following:
      accessing and analyzing the design layout to extract an electrical netlist, the electrical netlist identifying all elements, input nodes, output nodes, power supply nodes and interconnects in the design layout and further associating all the interconnects with electrical resistors;
      extracting a thermal netlist based on the electrical netlist and using a one-to-one mapping technique such that the thermal netlist identifies thermal resistors, external thermal nodes and internal thermal nodes and such that each thermal resistor corresponds to a single electrical resistor, each external thermal node corresponds to a single one of an input node, an output node and a power supply node, and each internal thermal node corresponds to a single element;
      combining the electrical netlist and the thermal netlist into a combined thermal-electrical netlist by electrically connecting the internal thermal nodes of the thermal netlist to the elements of the electrical netlist;
      performing simulations using the combined thermal-electrical netlist to generate a thermal-aware performance model of the integrated circuit;
      determining, based on the thermal-aware performance model, whether the integrated circuit meets a performance requirement;
      when the integrated circuit meets the performance requirement, releasing the design layout as a final design layout for manufacturing; and
      when the integrated circuit fails to meet the performance requirement, modifying the design layout to meet the performance requirement and releasing the final design layout for manufacturing.

8. The system of claim 7, the processor further performing the following, during performance of the simulations:
   determining electrical resistances of the electrical resistors; and,
   based on the electrical resistances, determining thermal resistances of the thermal resistors.

9. The system of claim 8, the processor further performing the following, during performance of the simulations:
   associating preselected first temperatures with the external thermal nodes;

using the preselected first temperatures at the external thermal nodes and the thermal resistances of the thermal resistors to determine second temperatures at the internal thermal nodes; and applying the second temperatures to the elements.

10. The system of claim 9, the preselected first temperatures each being equal to a same ambient temperature.

11. The system of claim 7, the integrated circuit comprising any number of one or more library elements.

12. The system of claim 7, each element being any one of a library element and a customized element and comprising any of a single device and a set of interconnected devices.

13. A computer program product comprising a non-transitory computer readable storage medium storing program instructions, the program instructions being executable by a processor to cause the processor to perform a method, the method comprising:

accessing, from a memory, a design layout of an integrated circuit;

analyzing the design layout to extract an electrical netlist, the electrical netlist identifying all elements, input nodes, output nodes, power supply nodes and interconnects in the design layout and further associating all the interconnects with electrical resistors;

extracting a thermal netlist based on the electrical netlist and using a one-to-one mapping technique such that the thermal netlist identifies thermal resistors, external thermal nodes and internal thermal nodes and such that each thermal resistor corresponds to a single electrical resistor, each external thermal node corresponds to a single one of an input node, an output node and a power supply node, and each internal thermal node corresponds to a single element;

combining the electrical netlist and the thermal netlist into a combined thermal-electrical netlist by electrically connecting the internal thermal nodes of the thermal netlist to the elements of the electrical netlist;

performing simulations using the combined thermal-electrical netlist to generate a thermal-aware performance model of the integrated circuit;

determining, based on the thermal-aware performance model, whether the integrated circuit meets a performance requirement;

when the integrated circuit meets the performance requirement, releasing the design layout as a final design layout for manufacturing; and when the integrated circuit fails to meet the performance requirement, modifying the design layout to meet the performance requirement and releasing the final design layout for manufacturing.

14. The computer program product of claim 13, the method further comprising, during performance of the simulations:

determining electrical resistances of the electrical resistors; and, based on the electrical resistances, determining thermal resistances of the thermal resistors.

15. The computer program product of claim 13, the method further comprising, during performance of the simulations:

associating preselected first temperatures with the external thermal nodes;

using the preselected first temperatures at the external thermal nodes and the thermal resistances of the thermal resistors to determine second temperatures at the internal thermal nodes; and applying the second temperatures to the elements.

16. The computer program product of claim 15, the preselected first temperatures each being equal to a same ambient temperature.

17. The computer program product of claim 13, the integrated circuit comprising any number of one or more elements, each element being any of a library element and a customized element and comprising any of a single device and a set of interconnected devices.

* * * * *